April 22, 1969     L. L. KESSLER     3,440,521

TEMPERATURE CONTROL MEANS

Filed Jan. 23, 1967

United States Patent Office 3,440,521
Patented Apr. 22, 1969

3,440,521
TEMPERATURE CONTROL MEANS
Leland L. Kessler, Lima, Ohio, assignor to Westinghouse Electric Corporation, Pittsburgh, Pa., a corporation of Pennsylvania
Filed Jan. 23, 1967, Ser. No. 610,913
Int. Cl. G05f 1/44
U.S. Cl. 323—19                                    6 Claims

ABSTRACT OF THE DISCLOSURE

A circuit arrangement for gradually controlling the supply of power to the heater of a windowpane of an aerospace vehicle in response to the sensed window temperature. The arrangement includes two ramp generators, an AND circuit, and a power amplifier. One of the ramp generators is designed to produce a voltage having slowly rising ramp while the other generator functions to produce a more rapidly rising and falling ramp voltage in response to a digital signal from a temperature sensing circuit. The AND circuit applies the lower of the two ramp voltages to the power amplifier as the control bias therefor. The power amplifier is thereby controlled to apply power to the heater at a rate of increase corresponding to the slowly rising ramp voltage when the window is cool, and to apply and remove power at the rate of the more rapidly rising and falling ramp voltage when the window is warm.

---

The present invention relates to automatic control circuits, and especially to a system for controlling the supply of electrical energy to a load in a gradual manner.

In general, the present invention contemplates the provision of an electronic control for use in connection with electrically heated windows such as are employed in airplanes and aerospace vehicles, though the invention is not limited thereto. In order to govern the supply of electrical energy to a heating element associated with a windowpane to maintain the window temperature at a desired value (for example, to prevent the accumulation of ice thereon), a temperature sensing device is disposed in heat exchange relationship with the windowpane, such as shown and described in U.S. Patents 2,462,207; 2,470,633 and 2,680,-215 issued on Feb. 22, 1949, May 17, 1949 and June 1, 1954, respectively, to C. L. Mershon and assigned to the present assignee. The output signal from the sensor is used to operate a relay, the contacts of which are opened and closed to open and close the supply circuit to the window heating element in an abrupt, on-off manner; that is, maximum power is instantly applied to the window until a steady-state temperature is reached; the power is then abruptly removed. Thus, this on-off operation applies and removes power to the windowpane as a necessary method of maintaining the desired temperatures.

As a direct consequence of the use of these on-off control means, airline operators are experiencing damaged windshields. When maximum power is instantly applied to a cold window, thermal stresses are created therein; repeated thermal stresses result in window failure.

Another problem arising from the use of on-off window heater energization and de-energization is voltage modulation of the primary power system which, in airplanes and aerospace vehicles, can be very serious since it can cause malfunction of other load devices such as radar and navigational equipment.

The present disclosure describes a novel, low cost circuit arrangement in which two ramp generators are designed to control the supply of power to a cold window at a predetermined and linearly slow rate, and thereafter gradually remove and apply power automatically as the window cools and is reheated. This gradual application and removal of power to a load (window heater) is accomplished by controlling the bias voltage on an AC power amplifier supplying the load with electrical energy. The two ramp generator outputs function to provide the control bias by operating through an AND circuit so that the control bias follows the lowest of the two output voltages. When the circuit is turned on, the first ramp generator voltage starts increasing linearly with time at a rate of say 0.55 percent per second. The second ramp generator voltage increases at a rate of say 16 percent per second. Thus, power is applied to the cold window in accordance with the rate of increase of the first ramp generator output since the control bias provided by the two generators follows the lowest of the two voltages. When a steady-state temperature is reached, a temperature sensing device produces a digital output voltage which is instantly applied to the fast ramp generator to gradually reduce its output voltage towards zero. Power is now gradually (about 16 percent per second) removed from the heating load as the control bias follows the lowest ramp generator output voltage which drops towards zero at the faster rate of the second ramp circuit. As the temperature of the load again falls below the steady-state level, the temperature sensor will again have no output signal with the result that the ramp generators will again produce their gradually increasing (ramp) voltages. However, with an already rather warm window, power is reapplied at the faster rate (16 percent) of the second generator until its voltage output level exceeds that of the first (slow) ramp generator where a steady-state temperature level has not been reached; where it has been reached, power is applied and removed at the faster rate of the second ramp generator.

In the novel circuit arrangement herein disclosed, the rate of applying power to a cold window is substantially slower than that applied to a window already heated for obvious reasons. Both rates of applying and removing power are, however, slow enough for the voltage regulating means in the primary power system to maintain rated voltage during the power transition period, as well as to insure against the setting up of detrimental thermal stresses within the windowpane.

It is therefore an object of the invention to provide a novel control circuit which efficiently applies power to a load linearly from zero to full power at a predetermined substantially slow rate.

Another object of the invention is to provide a reliable control circuit which applies power to a load in such a manner that the primary power supply is substantially unaffected by the power application.

A more specific object of the invention is to provide a novel circuit arrangement designed to control the supply of power to a heated window at a rate which will protect the window from damaging thermal stresses and maintain rated primary voltage during the period of power transition.

These and other objects of the invention will become more apparent from the following detailed description taken in conjunction with the accompanying drawing in which.

Figure 1:
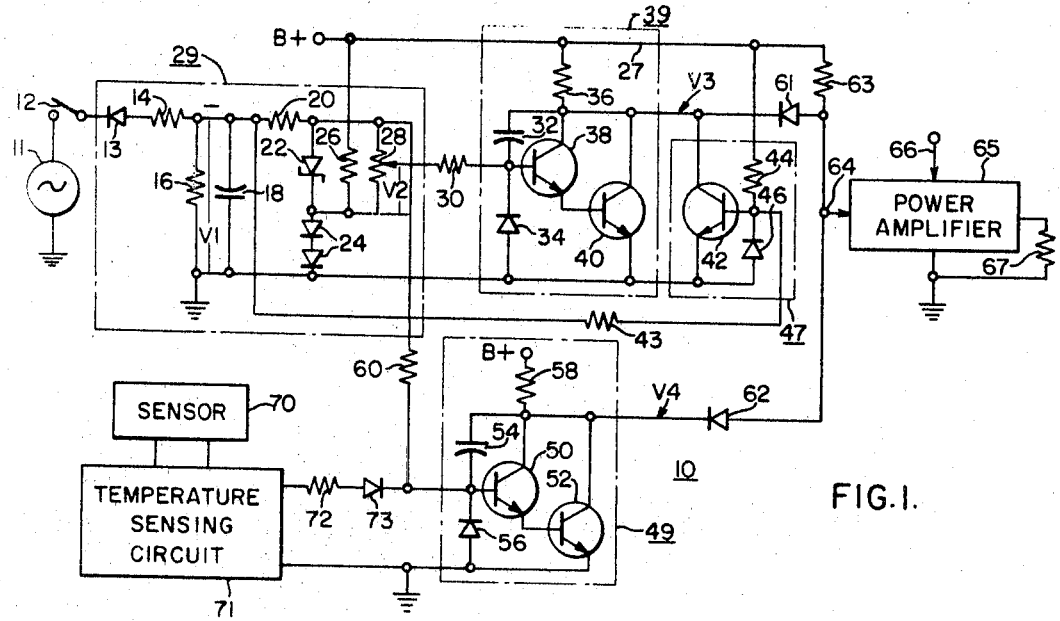
FIG. 1 is a schematic diagram of a circuit incorporating the principles of the present invention.

Specifically, FIG. 1 shows an illustrative embodiment of the circuit arrangement of the invention. The arrangement is generally designated 10, and is energized by a suitable primary source of current 11 which may be a 115 volt, 400 c.p.s. supply in an aircraft, though the invention is not limited thereto. The supply of current to the circuit 10 is controlled by an on-off switch 12 connected between the source 11 and a diode 13.

The diode 13 is connected to a voltage divider network comprising resistors 14 and 16 in a reverse manner so that the junction of resistors 14 and 16 a negative half wave voltage appears with the closing of the switch 12. Across the resistor 16 is connected a filter capacitor 18 and a circuit comprising a resistor 20, a Zener diode 22 and a pair of diodes 24, the resistor 20 and Zener diode 22 providing a regulated bias voltage supply in a manner to be explained hereinafter.

Across the Zener diode is connected an adjustable resistor or potentiometer 28 with one end thereof being further connected to lead 27 from a B+ supply (not shown) through a resistor 26. The components thus far described form generally a negative supply circuit or unit generally designated 29.

An input resistor 30 is connected between the adjustable arm of the potentiometer 28 and the base of a transistor 38 forming part of an amplifier circuit generally designated 39. A second transistor 40 is shown included in the amplifier circuit and connected to amplify the output of the first transistor 38. The collectors of the transistors are commonly connected to the B+ supply lead 27 by a current limiting resistor 36. A feedback impedance in the form of a capacitor 32 is provided for the transistors, and the transistors are protected from reverse bias voltages by a diode 34 connected between the base of the transistor 38 and ground.

A third transistor 42 is provided to control the output from the amplifier circuit 39 by being connected across the transistors 38 and 40 and having its collector connected to the collectors of the transistors 38 and 40, and to the current limiting resistor 36. A current limiting resistor 43 connects the base of the transistor 42 to the voltage divider network (resistors 14 and 16) provided in the negative supply circuit 29. The base of the transistor 42 is further connected to the B+ supply via a resistor 44, the transistor being protected from reverse bias voltage by diode 46 connected between its base and ground. The transistor 42 with resistor 44 and diode 46 form generally a reset circuit 47 which functions in a manner to be explained hereinafter.

A second amplifier circuit 49 is provided comprising two transistors 50 and 52, a feedback capacitor 54, a diode 56, and a B+ supply resistor 58. An input resistor 60 connects the amplifier to the potentiometer 28 in the negative supply circuit 29.

The amplifiers 39 and 49 are further respectively connected to the cathodes of two diodes 61 and 62 which form an AND circuit with resistor 63 connected between the B+ supply lead 27 and the anodes of the diodes. The AND circuit is connected to a power amplifier 65 (only representively shown) to provide a bias control signal for the amplifier. The power amplifier is connected through terminal lead 66 to a suitable primary source of current, for example, the current source 11. The amplifier 65 is further connected to control the supply of current to a load device 67, such as heating element disposed in or adjacent a windowpane in an airplane, in response to the bias control signal provided by the AND circuit.

In order to sense the temperature of the windowpane or panes to be heated, a sensing element 70 and sensing circuit 71 are provided which further control the operation of circuit 10 in a manner presently to be explained. The sensing circuit 71 is connected across the transistors 50 and 52 of the amplifier 49 with a resistor 72 and a blocking diode 73 providing a second input impedance to the amplifier. The sensing element 70 is disposed in a heat exchange relationship with the window, for example, as shown in the above cited patents.

In operation, with the closing of the switch 12, a negative voltage V1 (with respect to ground) is developed across the resistor 16 in the negative supply circuit 29 by conduction of the reverse diode 13 as mentioned earlier. The voltage V1 is filtered by the capacitor 18, and a portion thereof is shunt regulated by action of the resistor 20 and the Zener diode 22. A resultant, regulated filtered voltage V2 appears impressed across the potentiometer 28 to function as the bias supply voltage for the transistors 38 and 40. The resistor 26 and the two diodes 24 place the positive end of the potentiometer 28 at a potential above ground equal to the voltage drops across the two diodes. Such an arrangement compensates for the base to emitter voltage drops of the transistors 38 and 40 which are temperature sensitive. That is, the voltage drop across a diode has the tendency to be the same as that across a transistor. Therefore, with such a bias supply, the circuit disclosed is made more reliable with the current through the input resistance 30 being substantially a function of the voltage V2 only. And although it is not practical to make the voltage at the potentiometer end of the resistor 30 exactly equal to the voltage at the base of the transistor 38 the matching achieved by using randomly selected diodes and transistors is sufficient for most applications.

The amplifier 39 is a high gain device so that the base current of the transistor 38 is very small as compared to the current through the input resistor 30. Thus, the amplifier functions essentially as an operational amplifier. Such amplifiers are designed to perform the basic mathematical operations of addition, subtraction, differentiation and integration in analogue computers. The resistor 30 can then be considered the input impedance of the amplifier, and capacitor 32 the feedback impedance, in which case the amplifier 39 functions as an integrator. The operation of the circuit can be described by the following equation:

$$V3 = \frac{-1}{RC} \int_0^t V2 \, dt$$

where V2 is the negative voltage developed across the potentiometer 28, V3 is the output voltage produced by the transistors 38 and 40, R is the resistance of the resistor 30, and C is the capacitance of the capacitor 32. Assuming that voltage V2 is constant, then:

$$V3 = \frac{-V2}{RC} t$$

Thus, V3 is linear with respect to time.

Before switch 12 is closed, the transistor 42 in the reset circuit 47 is maintained in a conducting state by current flow through the resistor 44 connected in series between the base of transistor 42 and the B+ supply line 27. This clamps the voltage V3 across transistors 38, 40 to essentially ground potential since the emitter of the transistor 42 is connected directly to ground.

When switch 12 is closed, the negative voltage V1 is developed across the resistor 16 in negative supply circuit 29 as explained above. The negative voltage reverse biases the transistor 42, through the current limiting resistor 43, which unclamps voltage V3 from ground potential. V3 is now controlled by the amplifier 39.

The reset circuit 47 functions to reset the condition of circuit 10 to its original state when the AC power is lost to the circuit, such as when the switch 12 is opened; that is, voltage V3 is returned and clamped to ground by the conduction of the transistor 42. Thus, the reset circuit assures a zero start for the ramp voltage when operation is resumed after a power outage.

Figure 2:
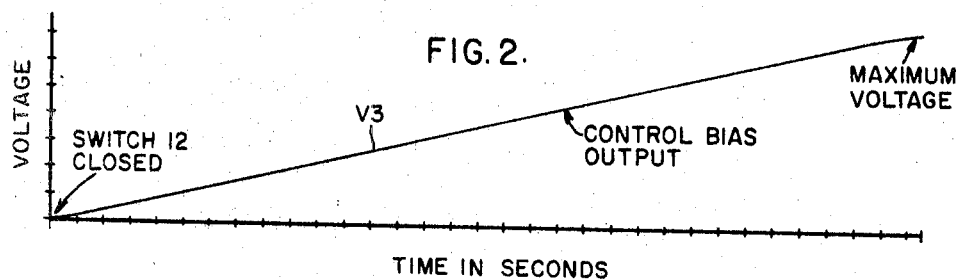
FIG. 2 is a graph showing the time relation of a control bias voltage with not output signal from a sensing circuit in the circuit of FIG. 1.

With the closing of the switch 12, the voltage V3 starts increasing from zero linearly with time (as mathematically described above) at a substantially slow rate determined by the negative voltage developed across adjustable resistor 28 and the circuit components comprising input feedback impedances consisting of the resistor 30 and capacitor 32, respectively. If the amplifier circuit 39 parameters are chosen to produce a rate of voltage rise of say 0.55 percent per second, it will take voltage V3 182 seconds to reach its maximum value. Thus, the amplifier 39 operates also as a ramp generator producing an output voltage pictorially shown in FIGS. 2 to 4 as a ramp having a positive slope.

Figure 3:
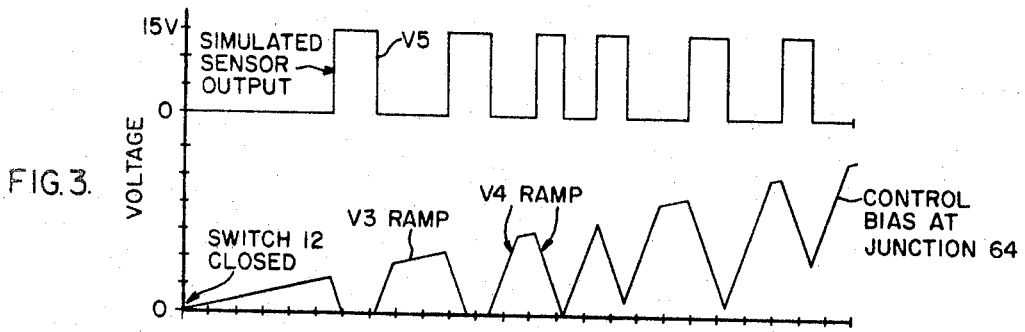
FIG. 3 is a simulated voltage output curve of a sensing circuit and its effect on the control bias voltage produced by the circuit of FIG. 1.

The second amplifier 49 operates in a manner similar to that of the amplifier 39, except that it is designed to produce a ramp voltage that changes in magnitude at a faster rate than that of the amplifier 39. An appropriate rate of voltage change for the amplifier 49 would be in the order of 16 percent per second, which is diagrammatically depicted in FIGS. 3 and 4 to be more fully explained hereinafter. Thus, the amplifier 49 produces a voltage V4 having a rapidly rising and falling ramp as best seen in FIG. 3.

The two ramp voltages V3 and V4 are applied to the two diodes 61 and 62, respectively, comprising the AND circuit with the resistor 63. The AND circuit then applies the lower of the two voltages, at a common junction 64 to the power amplifier 65 as a control bias voltage for the amplifier in a manner presently to be explained.

The diodes 61 and 62 are connected to ground through the conductance of the respective ramp generator transistor pairs 38 and 40, and 50 and 52. The transistor pair conducting the most during operation of circuit 10 provides a low impedance path to ground for the diode AND circuit; the transistor pair conducting the least will provide a higher impedance path to ground. The output voltage at the common junction 64 of the diodes is always the lower of the two (input) voltages on the diodes since the diode with the largest potential difference from the B+ return voltage conducts and cuts off the other diode. When the lower voltage diode conducts, its potential appears at the junction 64 since the voltage drop across the diode is negligible, the diode impedance being very low. Thus, the anodes of diodes 61 and 62 have a low voltage while the cathode of one will have high voltage; this higher voltage back biases that diode while the low voltage diode conducts placing its low potential at the junction 64 for bias control of the power amplifier 65.

The temperature sensing element 70 and the sensing circuit 71 are of the type which produces a digital output signal when the temperature being sensed is above a desired, predetermined value. Thus, in the circuit arrangement 10, the sensing circuit 71 produces no signal while the power is being applied to the heating load 67 associated with a cold window.

Figure 4:
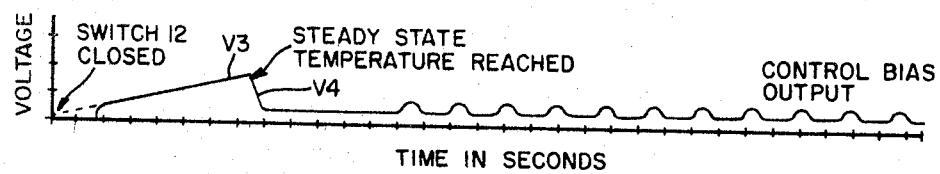
FIG. 4 shows the time-voltage operation of a closed loop system employing the circuit shown in FIG. 1.

When switch 12 is closed, and with no output from the sensing means 70 and 71, a negative potential from negative supply unit 29 is applied to the base of transistors 38 and 50 of the ramp generators 39 and 49. The transistors 38, 40, 50 and 52 are thereby turned on causing them to conduct and produce a gradually increasing (ramp) voltage by the flow of current through resistor 60 towards potentiometer 28. The voltage V4 provided by the generator 49, however, rises to a maximum level at a much faster rate than that of generator 39, as mentioned earlier, so that the control bias to the power amplifier 65 follows the low level of voltage produced by the generator 39 since both generators operate with the AND circuit described above. The cold window is gradually heated by the gradually increasing flow of current through heating load 67 supplied through the power amplifier 65, the bias of which is being changed at the slow rate of the increasing ramp V3. This is illustrated in FIG. 4.

When the temperature of the window being heated by the load 67 reaches a predetermined value, it is sensed by the sensing element 70, and the sensing circuit 71 produces a positive potential digital signal in response thereto which is applied through the input resistor 72 to the base of the transistor 50. This causes the transistors 50 and 52 to be turned off so that the voltage V4 produced thereby decreases towards zero as shown by the decreasing ramp in FIG. 4. The bias level on the power amplifier 65 follows the decreasing ramp of V4 when its voltage level passes below that of V3 by operation of the AND circuit. This causes the power applied to the window heating load 67 to decrease until the temperature of the window is lowered to the point that the sensor 70 again produces no signal at which time the above recited operation repeats itself. That is, the generators 39 and 49 again produce a ramp voltage having a positive slope with the consequent increase of power being supplied to the load 67 with a consequent increase in the temperature of the window until an output signal from the sensing circuit 71 again turns the generator 49 off, with the AND circuit then following the voltage of the resultant decreasing ramp below the level of positive ramp V3.

The operation of the generator 49 is not as critical as that of generator 39 since it functions primarily to control the level of bias power amplifier only after the window has been heated. As can be seen in FIG. 4, the slowly rising ramp provided by the generator 39 functions initially to maintain the flow of power to a cold window load over a considerable period of time, until a predetermined steady-state temperature level is reached. After the window is thereby heated to the steady state level, further steady-state levels are reached much sooner. The amount of power supplied to a heated window load is much lower with the consequent faster ramps provided by the generator 49 which appear as undulations in FIG. 4. In other words, the fast ramp generator takes over the operation of controlling the bias level to the power amplifier 65 after the cold window is initially heated.

The graph depicted in FIG. 3 shows the type of ramp voltages produced by the generators 39 and 49 in response to a simulated digital voltage V5 such as might be produced by a temperature sensing circuit.

As shown in FIG. 3, and as explained above, when the switch 12 is closed, ramp voltages V3 and V4 begin their rise toward maximum value. The V3 ramp voltage appears at the junction 64 as the control bias voltage for the power amplifier 65 by virtue of the operation of the AND circuit diodes 61 and 62 since the ramp V4 rises rapidly to a maximum value above that of V3 to back bias the diode 62. However, with a voltage pulse, such as V5, applied to the base of the transistor 50, V4 immediately begins its descent. When the voltage level of V4 descends below that of rising ramp V3, the AND immediately begins to follow the lower descending voltage V4. When the pulse V5 is cut off, the generator 49 again starts its fast ramp increase from zero voltage, and this ramp voltage appears at the junction 64 until it passes through the level of the slowly rising ramp of V3. FIG. 3 shows graphically the results of this progress being repeated several times. The voltage at the junction 64 reaches the maximum voltage level capability of the generators 39 and 49 with the simulated pulses V5.

It should now be apparent from the foregoing description that a novel bias level control circuit has been disclosed which does not have the problems encountered in on-off arrangements presently used to control the application of power to heated window loads. As mentioned earlier, control circuits that allow the abrupt application and removal of power to a heated windowpane cause thermal stresses therein that result in window failures. The importance of maintaining sound window structures in high altitude aircraft and space vehicles is obvious. A second detrimental result of on-off applications of power is its modulating effect on the power system of the craft. It is again of utmost importance that electronic equipment on aerospace vehicles be unaffected by changes in supply voltages. The novel arrangement disclosed herein obviates these problems by use of two inexpensive ramp generators supplying the bias voltage to a power amplifier through a simple AND circuit. The circuit is further light in weight, dependable in performance, and low in cost and power dissipation, thus making it especially adaptable for aerospace vehicles.

Though the invention has been described with a certain degree of particularity, it is to be understood that the disclosure herein presented has been made by way of example only and that changes may be made therein without departing from the spirit and scope of the invention.

What is claimed is:

1. A control circuit arrangement for controlling the supply of power to a load device comprising, power amplifier means connected to supply power to the load device, circuit means for supplying a bias voltage to the power amplifier means, means for sensing a condition of the load device and for producing a control signal in response thereto, first circuit means for producing a first ramp voltage with a positive slope, second circuit means for producing a second ramp voltage with a positive slope, means for applying the control signal produced by the sensing means to the second circuit, the control signal being effective to turn the second circuit off in such a manner that a negative slope ramp voltage is produced, said bias supply circuit means being connected to receive the ramp voltages and to apply the lower of the two voltages to the power amplifier means as the control bias voltage so that the power supplied to the load device by the power amplifier changes in accordance with the voltage levels of the two ramp voltages.

2. The control circuit arrangement of claim 1 in which the first and second circuit means are operational amplifiers.

3. The control circuit arrangement of claim 1 in which the circuit means for supplying the bias voltage to the power amplifier is an AND circuit.

4. The control circuit of claim 1 in which the sensing means includes a sensing circuit adapted to produce a digital output signal as the control signal.

5. The control circuit arrangement of claim 1 in which the sensing means includes a temperature sensing device.

6. The control circuit arrangement of claim 1 including a reset circuit connected to the first circuit and effective to clamp the ramp voltage produced thereby to ground potential when the circuit is disconnected from a primary source of power.

References Cited

UNITED STATES PATENTS

| | | | |
|---|---|---|---|
| 2,787,696 | 4/1957 | Karp et al. | 219—203 |
| 2,979,596 | 4/1961 | Karp | 219—203 X |
| 3,389,328 | 6/1968 | Janson | 323—19 |

JOHN F. COUCH, *Primary Examiner.*

A. D. PELLINEN, *Assistant Examiner.*

U.S. Cl. X.R.

219—203; 236—78; 244—134; 323—25, 38